July 5, 1960 R. H. CURTISS ET AL 2,943,712
BRAKE LINING
Filed May 16, 1957
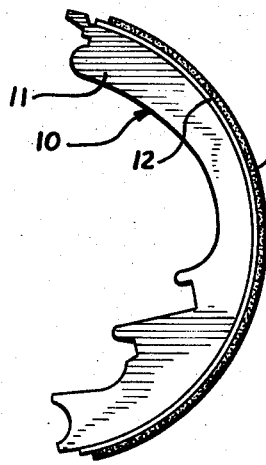
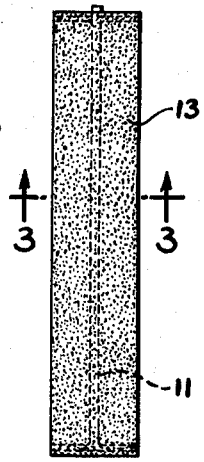
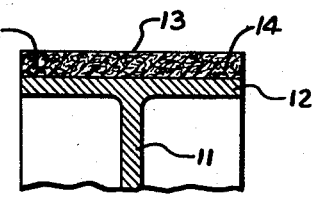
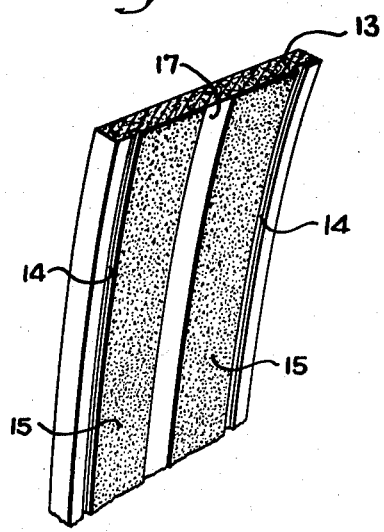
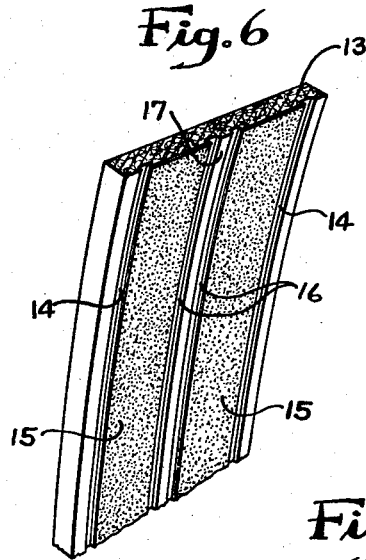
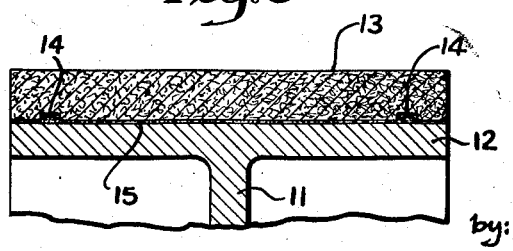
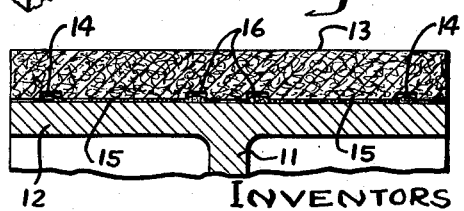
INVENTORS
RAYMOND HOWARD CURTISS
MALCOLM JAMES FORD
by: Gary, Desmond & Parker
ATTYS.

United States Patent Office 2,943,712
Patented July 5, 1960

2,943,712
BRAKE LINING

Raymond Howard Curtiss, Trumbull, and Malcolm James Ford, Milford, Conn., assignors to Raybestos-Manhattan, Inc., Passaic, N.J., a corporation of New Jersey Filed May 16, 1957, Ser. No. 659,631

6 Claims. (Cl. 188—234)

This invention relates to improvements in brake linings, and particularly to brake shoe linings adapted to be adhesively bonded to a brake shoe rim, and to brake shoe assemblies adapted to frictionally engage a brake drum.

It is known to adhesively bond such brake linings by, for example, applying thermosetting resin adhesives to the brake lining, in the form of a solvent solution followed by drying, and to subsequently bond the prepared lining to the rim of the brake shoe under pressure and heat adequate to heat-harden, cure or thermoset the binder. In such processes the heat and pressure applied initially causes the resin to flow, and in the conventional prior arrangements this resulted in "flashing" or flowing of resin out beyond the side edges of the brake lining-brake shoe rim assembly.

This resin which was thus squeezed out under pressure and flowed out under heat of the operation became hardened under the influence of the heat employed, and in order to provide a merchandisable item it was necessary to trim the edges of the assembly; that is, to remove the "flashed" material, which is a considerable expense in large scale commercial operation.

It is therefore one object of the present invention to provide modified brake lining adapted for adhesive bonding, constructed in a manner whereby such flashing of bonding resin or cement will be eliminated and thus eliminate the necessity for a subsequent finishing or cleaning operation, as by grinding, after the bonding step.

This is accomplished in one specific embodiment of the present invention by forming one face of brake lining strip material, or the concave face of arcuate brake lining units, with at least two grooves, each one adjacent to but inwardly of one of the longitudinal edges of the lining, and the application of the bonding cement to said face between the groove lines. With the aforesaid improvement, when the brake lining is bonded to the brake shoe rim under heat and pressure, even though the resin as usual will initially flow under heat and pressure, side flow thereof will be limited and trapped by the grooves to limit further outward flow beyond the outer edges of the assembly, thus eliminating the previously costly finishing operation.

It is further known to apply bonding cement to brake linings in the form of spaced bands whereby to leave an uncoated area overlying the longitudinal axis of the brake lining for the purpose of greatly reducing or eliminating noises in operation; that is, high pitched noises incident to braking engagement of a shoe assembly and the companion brake drum. However, such prior proposals have not always proved successful or have necessitated the employment of bands of adhesive of undesirably narrow width, in that here again, under necessary heat and pressure of bonding, the thermosetting resins employed initially flow before they become thermoset, and during such flowing have a tendency to flow together even though initially applied in the form of two spaced bands.

It is therefore another object of the present invention to insure that the retention of separately applied bands of adhesive will remain spaced under the brake lining so that uncemented areas of desired width will remain fixed and thereby insure noise reduction or elimination, as originally intended.

This modification of the present invention is accomplished by providing brake lining strip material on the underface thereof, or on the concave face or arcuate strips of brake lining, with two longitudinally extending grooves spaced from each other on opposite sides of and adjacent to the longitudinal axis of the brake lining, and the application of bonding cement outwardly of the groove areas, leaving a central uncoated area. Thus, when heat and pressure are applied to bond the brake lining to the brake shoe, any initial flow of resin is entrapped in the grooves, thus limiting the lateral flow and preserving an area embracing the longitudinal axis of the brake lining free of cement and thus maintaining it for its intended noise elimination or noise reduction purposes.

In a further modification of the present invention we employ both of the foregoing embodiments at the same time to jointly bring about the aforesaid desirable advantages.

Other objects and advantages of the present invention and economies thereof will be apparent from a consideration of the specification and the accompanying drawings, wherein:

Fig. 1 is a side elevational view of a brake shoe with a friction material lining bonded to the arcuate rim thereof; and Fig. 2 is a front elevational view thereof.

Fig. 3 is a section on the line 3—3 of Fig. 1 illustrating a brake lining formed with grooves in accordance with one form of the present invention.

Fig. 4 is a fragmentary perspective view of the friction lining of Fig. 3 before being bonded to the shoe.

Fig. 5 is a view similar to that of Fig. 3 but enlarged to illustrate the advantages of the present invention.

Fig. 6 is a view similar to that of Fig. 4 but of a modified form of the invention.

Fig. 7 is a view similar to that of Fig. 5, with reference to the modified form.

Referring to the drawings, the reference numeral 10 generally designates a metallic brake shoe comprised of a rib 11 and an arcuate rim 12 to which there is bonded a brake lining 13 generally coextensive with the width of the rim 11 and substantially coextensive with the length thereof.

The brake lining is of conventional composition as far as the present invention is concerned, and as usual is comprised of a fibrous material such as asbestos and a heat hardened binder such as phenol formaldehyde thermosetting resin, drying oil, rubber, or mixtures, and usually with added fillers or fraction modifying agents.

The bonding is accomplished by interposing heat-hardenable or thermosetting cement, such as well-known phenol-formaldehyde condensation product resins; epichlorohydrin-bisphenol condensation thermosetting epoxy resins; mixtures thereof, and the like, in the form of solvent solutions, by painting or spraying them onto the brake lining and permitting them to dry so as to leave bands of heat and pressure activatable and curable cement. Brake linings provided with such adhesive may be bonded to the metallic rims of the brake shoes under pressure of, for example, 250 to 1000 pounds per square inch at temperatures of from 300 to 400° F. for periods of from 10 minutes down to one minute, higher temperatures requiring shorter curing time, as is well known in the art.

Fig. 4 of the drawing shows a brake lining strip 13, the under or concave face thereof being formed with the grooves 14, 14 extending longitudinally thereof and disposed adjacent to but spaced inwardly of the longitudinal defining edges or side edges of the strip. These grooves 14, 14 may be molded into the lining 13 before or during cure of the binder content thereof, or may be subsequently machined therein.

As shown in this Fig. 4, the thermosetting or bonding cement is applied to the same underface in the form of two bands 15, 15 spaced from each other along the longitudinal axis of the strip, the spacing along the longitudinal axis of this form being conventional for the purpose of leaving an unbonded area 17 and to thereby eliminate the tendency toward production of undesirable noises in operation.

Reference to Fig. 5 shows bonding of the brake lining 13 of Fig. 4 to the rim 12 of a brake shoe after heat and pressure, and further illustrates the flowing and entrapment of adhesive from the bands 15, 15 into the grooves 14, 14 and the prevention of further flow of adhesive outwardly beyond the groove lines. As further shown by this illustration, even though it was originally intended to leave an uncoated area along the longitudinal axis of the lining, because of the inherent nature of the bonding agents used and their subjection to heat and pressure to cause them to desirably flow and fill out voids between the mating surfaces of the brake lining and brake rim, some of the bonding cement has flown together along the longitudinal axis and eliminated, at least in part, the intended effect of having an uncoated central area.

Figs. 6 and 7 illustrate how prevention of flow of the bonding cement under heat and pressure along the longitudinal axis of the brake lining may be positively prevented and an uncoated area 17 retained. Thus, the brake lining 13 is here proided not only with the grooves 14, 14 adjacent its longitudinal edges, but additionally with a second pair of longitudinally extending grooves 16, 16 adjacent to but spaced from the longitudinal axis of the strip and of course inwardly of the grooves 14, 14. In this case the bands of cement 15, 15 may be in each case applied to the full width, or to as much of the width as desired, between a groove 14 and a groove 16. The section of Fig. 7 illustrates the bonding of a brake lining of Fig. 6 to a brake shoe, and further indicates the limitation of flow and entrapment of excess cement not only in the groove 14, 14 adjacent the outer edges of the assembly, but also in the grooves 16, 16 adjacent the longitudinal axis of the assembly, thereby not only insuring retention of an uncoated area 17 along the longitudinal axis of the brake lining-brake shoe rim assembly, but also preventing flash or outward flow of cement on the side edges of the assembly.

Although we have shown and described the preferred embodiments in brake linings, it will be understood that modifications may be made in the details thereof without departing from the spirit of our invention.

We claim:

1. Brake lining adapted to be adhesively bonded under heat and pressure to a metallic brake shoe rim, comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowable and hardenable adhesive disposed on the concave face of said strip only between said grooves.

2. Brake lining adapted to be adhesively bonded under heat and pressure to a metallic brake shoe rim, comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowable and hardenable adhesive disposed on the concave face of said strip only between said grooves in the form of two laterally spaced longitudinally extending bands.

3. Brake lining adapted to be adhesively bonded under heat and pressure to a metallic brake shoe rim, comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowable and hardenable adhesive disposed on the concave face of said strip only between said grooves in the form of two laterally spaced longitudinally extending bands, the concave surface of said brake lining being further formed with a longitudinally extending groove disposed between said spaced bands of adhesive.

4. Brake lining adapted to be adhesively bonded under heat and pressure to a metallic brake shoe rim, comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowable and hardenable adhesive disposed on the concave face of said strip only between said grooves in the form of two laterally spaced longitudinally extending bands, the concave surface of said brake lining being further formed with a pair of laterally spaced longitudinally extending grooves disposed between said spaced bands of adhesive and defining an axially disposed dam.

5. The combination with the arcuate rim of a metallic brake shoe of a brake lining, said lining comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowed and hardened adhesive disposed on the concave face of said strip only between said grooves bonding said strip to said rim.

6. The combination with the arcuate rim of a metallic brake shoe of a brake lining adhesively bonded thereto, said lining comprising an arcuate strip of friction material, the concave surface thereof being formed with longitudinally extending grooves adjacent to but spaced from and not opening to the side edges of the strip, the outboard sides of said grooves and the edges of the lining defining longitudinally extending relatively narrow edge dam portions, and normally dry but heat flowed and hardened adhesive disposed on the concave face of said strip only between said grooves in the form of two laterally spaced longitudinally extending bands and in bonded relationship thereat with said rim, the concave surface of said brake lining being further formed with a pair of laterally spaced longitudinally extending grooves disposed between said spaced bands of adhesive and defining an axially disposed dam.

References Cited in the file of this patent

UNITED STATES PATENTS

| 1,756,936 | Bendix | May 6, 1930 |
| 2,239,574 | Schnell | Apr. 22, 1941 |
| 2,647,592 | Tilden | Aug. 4, 1953 |
| 2,781,107 | Smith et al. | Feb. 12, 1957 |
| 2,871,996 | Strebinger | Feb. 3, 1959 |